United States Patent

Cole et al.

[15] 3,642,620
[45] Feb. 15, 1972

[54] PROCESS FOR TREATING WASTES FROM OXIDATION PROCESSES

[72] Inventors: Edward L. Cole, Fishkill; Howard V. Hess, Glenham, both of N.Y.

[73] Assignee: Texaco Inc., New York, N.Y.

[22] Filed: Oct. 14, 1969

[21] Appl. No.: 866,215

Related U.S. Application Data

[63] Continuation-in-part of Ser. No. 780,080, Nov. 29, 1968, Pat. No. 3,507,788.

[52] U.S. Cl. .................................................210/63
[51] Int. Cl. ..............................................C02c 5/04
[58] Field of Search.................210/12, 15, 63, 71; 23/1, 48

[56] References Cited

UNITED STATES PATENTS 3,449,247   6/1969   Bauer .....................................210/63
2,824,058   2/1958   Zimmermann .........................210/63

FOREIGN PATENTS OR APPLICATIONS 1,074,391   1/1960   Germany ................................23/48

*Primary Examiner*—Michael Rogers
*Attorney*—Thomas H. Whaley and Carl G. Ries

[57] ABSTRACT

A process for treating a waste feed stream containing essentially water-soluble organic wastes is described as involving heating the stream under turbulent flow conditions to temperatures of 400° to 700° F. and pressures of 300 to 3100 p.s.i. in the presence of air or of oxygen thereby splitting off carbon dioxide. The oxidized waste stream, which has a considerably reduced chemical oxygen demand, is continuously fed to a hot contacting zone and is in heat-exchange relationship with the incoming effluent stream.

8 Claims, 1 Drawing Figure

PATENTED FEB 15 1972
3,642,620
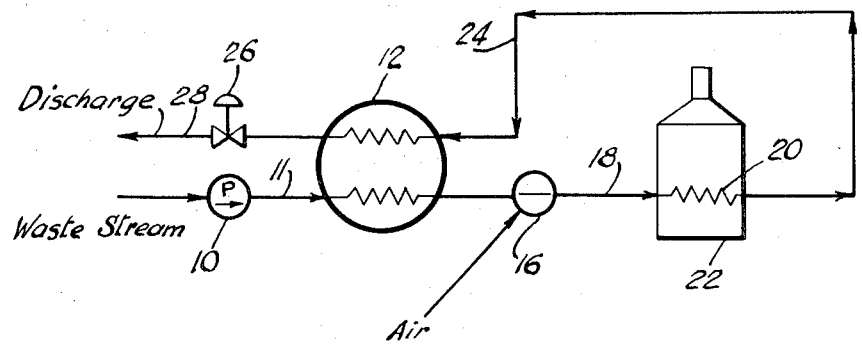

3,642,620

PROCESS FOR TREATING WASTES FROM OXIDATION PROCESSES

CROSS-REFERENCE TO COPENDING APPLICATIONS

This application is a continuation-in-part of our commonly assigned application Ser. No. 780,080 filed Nov. 29, 1968, now U.S. Pat. No. 3,507,788.

1. Field Of Invention

This invention relates to a continuous process for the abatement of water pollution by removing essentially water-soluble oxidizable organic wastes by oxidizing these compounds in the liquid phase under autogenous pressure.

2. Description of the Prior Art

The main objects of processes for the treatment of waste streams is to produce a sterile, nonputrescible solid residue which can be separated later from the effluent as well as an effluent which is unobjectionable for final disposal.

A number of methods have been developed for reducing the chemical oxygen demand (COD) of effluent industrial wastes such as biological sludges from chemical and pharmaceutical plants. Among such methods are the wet air oxidation and the activated sludge digestion processes. In the activated sludge processes, organic sludge is subjected to anaerobic and aerobic bacterial action or both. In the wet air oxidation processes, an aqueous slurry of sludge is subjected to oxidation with air at elevated temperature and pressure.

In a newer process, raw primary activated sludge having a chemical oxidation demand of the order of 40 grams of oxygen per liter is oxidized batchwise with the aid of steam injection under relatively quiescent conditions in heavy, thick-walled reactors at around 525° F. and 1,750 p.s.i.g. These reactors are charged once every 24 hours and reduce the chemical oxidation demand of the effluent liquid to around 10 g./l. or by about 75 percent.

All the above-outlined processes basically only concentrate the sludge so that it can be disposed of more rapidly; are relatively costly and additionally, the conditions under which they are carried out are not severe enough to dispose of very stable and resistant contaminants such as maleic acid, fumaric acid, phthalic acid, terphthalic acid and the like. Currently, these are handled by bacterial oxidation in ponds but this requires considerable land to hold the waste stream and is slow.

OBJECTS AND SUMMARY OF THE INVENTION

The main object of this invention is to provide an economical and efficient continuous process for reducing the chemical oxygen demand of effluents containing essentially water-soluble organic wastes.

Another object of the claimed invention is to provide an inexpensive and efficient process for treating a waste feed stream obtained by preliminary coking of biological sludge containing dissolved and suspended organic matter to further reduce the COD of such effluent to a figure whereby the same can be disposed of in natural water systems containing marine life without any biological treatment.

In the process of the present invention whereby the foregoing objects are attained, a waste feed stream containing essentially water-soluble organic wastes is continuously subjected to noncatalytic air oxidation at a temperature in the range of 400° to 700° F. at a pressure within the range of 300 to 3,100 p.s.i. under turbulent conditions for a contact time ranging from 0.1 minute to 2 hours whereby substantially all the organic wastes are oxidized to carbon dioxide and water.

DESCRIPTION

The process of this invention will be better understood by referring to the accompanying FIGURE illustrating diagrammatically a preferred embodiment of the present invention as applied to the treatment of a waste feed stream containing maleic and fumaric acids.

With reference to the FIGURE, a waste feed stream containing the above-mentioned acids is pumped by pump 10 through line 11 into heat exchanger 12 in which its temperature is increased by contact with hot oxidized effluent on its way to be discharged through line 24. The waste feed stream passes through mix valve 16 where compressed air or oxygen at system pressure is sprayed into the stream and flows concurrently therewith through line 18, and tubular coil 20 in fired heater 22. Turbulent flow conditions are thus imparted to the waste feed stream so that intimate contact between the stream and the air or oxygen is achieved, to bring about decarboxylation and dehydroxylation of the dissolved organic materials with formation of carbon dioxide. By analogy with concurrent heat transfer studies between immiscible fluids it can be postulated that an optimum theoretical contacting stage is less than 4 feet. Considering that satisfactory COD reduction required three such contacting stages or coils, this can be done in a 12-foot coil which can be heated in already existing facilities such as an incinerator heater box.

A suitable temperature range to which the waste feed stream must be heated is 500° to 700° F. The temperature at which the process operates is important because of compression costs. Generally the pressure is slightly above the vapor pressure of water for the effluent stream, which places it in the range of 300 to 3,100 p.s.i. In practice the pressure is set by a back pressure regulator (not shown) at a point slightly above the vapor pressure of water at the given temperature. The interrelationship between temperature, pressure, and the solubility of oxygen in water is well known and the temperature and pressure ranges above given ensure that the oxygen will be dissolved in the aqueous phase of the waste feed stream and hence in intimate contact with the dissolved organic material. Use of oxygen or of air enriched with oxygen allows operation of the process at temperatures and pressures below the ranges given above.

As shown in the figure, the oxidized effluent passes through the heat exchanger where it heats the waste feed stream and then through a pressure reducing valve 26 before being discharged through line 28.

The flow of liquid and air or oxygen in the tubular reactor should be turbulent and for a given tube reactor the type of flow depends on the quantity of fluid flowing through the reactor. Turbulent flow is desirable for better contact between air and organic matter with the result that better conversion of the organic matter to $CO_2$ and water will be obtained. A useful relationship that substantially indicates the type of flow in a tube is the Reynolds number. The Reynolds number is defined as:

$$N_{Re} = DV/\mu\rho$$

where:
$N_{Re}$ = Reynolds number
$D$ = Inside diameter of tube, ft.
$V$ = Average linear velocity, ft./sec.
$\rho$ = Fluid density, lb./cu.ft.
$\mu$ = Fluid viscosity, lb./(ft.) (sec.)

Preferably Reynolds numbers above 4,000 should be maintained in the tubular reactor. The tubular reactor suitably has an internal diameter within the range of ½ to 4 inches. The length of the reactor tube is preferably such that the average residence time of liquid in the tube is at least 1 minute. The air pressure supplied should be slightly above the vapor pressure of the system at operating temperature so that the waste stream is maintained substantially in the liquid phase. Generally, it is desirable to operate the heating step so that the pressure at the outlet from the tubular reactor is near or only slightly greater than the vaporization temperature of water at the reactor outlet. To conserve heat, it is generally desirable to maintain the pressure at the outlet of the tubular heating zone higher than the vapor pressure of water at the outlet temperature of the heating zone.

While the above description represents the preferred mode of carrying out the claimed process, it will be appreciated that the same is amenable to various modifications. Thus, the air or the oxygen could be added at different or multiple points in the system. Depending upon the precise nature of the organic waste materials, it might be better to add the oxidant to the effluent waste stream before the heat exchanger or again it might be necessary to add additional oxidant within or into the heater coil.

In a modification of the present process, the oxidized effluent while still under system pressure is let down through conventional pressure recovery equipment so that its energy can be recovered to pump up the waste feed stream to system pressure.

In a further modification of the invention, the pressure of the oxidized effluent is let down through conventional pressure recovery equipment and used to supply energy for compressing the oxidant gas.

In the following examples, and throughout the present specification, the term "chemical oxygen demand," abbreviated "COD", is used in its usual sense of denoting the total oxidizable material present in the liquid under consideration regardless of whether or not it is biodegradable. The term "BOD" denotes the amount of oxygen consumed during a 5-day period of bacterial activity at 20° C. on a chemically standardized and stabilized sample; while COD is not strictly comparable to the biological oxygen demand (BOD) it is useful as an indication of reduction of BOD to give a basis for comparison of the effectiveness of alternate methods of treatment, particularly when applied to comparable waste samples.

EXAMPLE 1

The following example illustrates the effectiveness of the claimed process in the liquid phase oxidation of a maleic anhydride plant effluent. The composition had roughly 10 percent dissolved maleic acid and fumaric acid. 1

Simulated Effluent Composition
4.2 g. Fumaric Acid
(Sat'n at room temp)        9.1 wt. % dissolved
55.8 g. maleic acid          organics
600 g. distilled water       COD=78,170

Two hundred g. of this material was charged to a 1,960 cc. bomb. The bomb was pressured to 300 p.s.i.g. with air at room temperature, heated to 650° F. for 2 hours (2,900 p.s.i.g. developed), cooled to atmospheric and the liquid sampled. This effluent had a COD of 17,467 for a reduction of 77.6 percent in this one oxidation stage. Calculations indicate that the oxygen was completely used up.

The remaining liquid in the bomb was again pressured to 300 p.s.i.g. and the bomb was heated to 650° F. under rocking conditions for 2 hours (2,400 p.s.i.g.), then cooled and 149 g. liquid (1807 mg./0₂/liter COD) recovered for an overall COD reduction in the two-stage contacting of 97.7 percent. An overall recovery of 186 g. of liquid was obtained. The difference between the 186 g. recovered and the 200 g. charged can be accounted for by the oxidation of the maleic and fumaric acids to produce $CO_2$ and water.

EXAMPLE 2

A total waste stream from a refinery reservoir was found to have a relatively low COD of 300. This COD was reduced to 148 by oxidizing at 400° F. However, by treating the stream according to the invention at 450° F. and injecting air at 500 p.s.i.g., the COD was reduced to 62.

Repeating the process just given but at 500° F. reduced the COD to 40 which is a value entirely acceptable for discharge into any body of water.

EXAMPLE 3

An overflow stream from a disposal pit had a COD of 2,900. This stream was oxidized by the method of the invention in three stages at 500° F. using air at 500 p.s.i.g. and had its COD reduced to 718 or a reduction of 75 percent.

EXAMPLE 4

Bottoms from a methanol tower from lube oil additive manufacture were found to have a high COD (61,500). One stage of treatment by the process of the invention involving burning at 600° F. with air reduced the COD to 11,450, a reduction of 81 percent.

It will be appreciated that the actual composition of the streams which can be successfully treated by the claimed process is not critical. COD reduction will take place as long as the stream treated contains essential water-soluble organic materials.

What is claimed is:

1. A process for treating a waste feed stream containing essentially water-soluble organic wastes including maleic acid, fumaric acid, phthalic acid and terphthalic acid comprising continuously passing said stream into and through at least one hot contacting zone, injecting an oxygen-containing gas in said stream and subjecting said stream while in said zone to noncatalytic air oxidation at a temperature ranging between about 400° F. and 700° F. at a pressure ranging from about 300 to 3,100 p.s.i. under turbulent flow conditions characterized by a Reynolds number greater than 2,000 for between about 0.1 minute and about 2 hours to produce an effluent stream wherein substantially all the organic wastes are oxidized to carbon dioxide and water.

2. The process according to claim 1 wherein said effluent stream is in heat exchange relationship with said waste feed stream.

3. The process according to claim 1 wherein an oxidizing gas is sprayed into said waste stream and caused to flow concurrently therewith through said contacting zone.

4. The process according to claim 1 wherein an oxidizing gas is added to the waste stream before the stream is heated.

5. The process according to claim 1 wherein a pressurized oxidizing gas is added to said waste stream.

6. The process according to claim 3 wherein an additional amount of said oxidizing gas is added to said stream as said stream is heated.

7. The process according to claim 1 wherein the pressure of said effluent stream is recovered and used to pump up said waste feed stream.

8. The process according to claim 1 wherein the pressure of said effluent stream is recovered and used to compress said oxidizing gas.

* * * * *